US006496822B2

(12) United States Patent
Rosenfelt et al.

(10) Patent No.: US 6,496,822 B2
(45) Date of Patent: Dec. 17, 2002

(54) METHODS OF PROVIDING COMPUTER SYSTEMS WITH BUNDLED ACCESS TO RESTRICTED-ACCESS DATABASES

(75) Inventors: Michael Rosenfelt, Houston, TX (US); Mark Gonzales, Mammoth Lake, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/290,723

(22) Filed: Apr. 12, 1999

(65) Prior Publication Data

US 2002/0065824 A1 May 30, 2002

(51) Int. Cl.[7] .............................................. G06F 17/30
(52) U.S. Cl. ................................ 707/9; 707/6; 707/223
(58) Field of Search ......................... 707/9, 6; 713/200, 713/201, 202; 714/1; 709/223

(56) References Cited

U.S. PATENT DOCUMENTS

| 4,715,818 | A |   | 12/1987 | Shapiro et al. .............. 434/118 |
| 5,147,205 | A |   | 9/1992 | Gross et al. ................. 434/169 |
| 5,193,056 | A |   | 3/1993 | Boes .......................... 364/408 |
| 5,318,450 | A |   | 6/1994 | Carver ........................ 434/336 |
| 5,845,265 | A |   | 12/1998 | Woolston ....................... 705/37 |
| 6,067,623 | A | * | 5/2000 | Blakley, III et al. ........ 713/201 |
| 6,088,796 | A | * | 7/2000 | Cianfrocca et al. ......... 713/152 |
| 6,105,027 | A | * | 8/2000 | Schneider et al. ............. 707/9 |
| 6,292,904 | B1 | * | 9/2001 | Broomhall et al. ............ 714/1 |
| 6,321,262 | B1 | * | 11/2001 | Springer |

OTHER PUBLICATIONS

Ziff–Davis "Home" Webpage: http://www.ziffdavis.com/index.htm, [Accessed Jan. 13, 1999].
Ziff–Davis "Who We Are" Webpage: http://www.ziffdavis.com/about/index.htm, [Accessed Jan. 13, 1999].
Ziff–Davis "What We do" Webpage: http://www.ziffdavis.com/properties/index.htm, [Accessed Jan. 13, 1999].
Ziff–Davis "Media and Market Info" Webpage: http://www.ziffdavis.com/education_index.htm, [Accessed Jan. 13, 1999].
Microsoft Corporation "Home" Webpage: http://www.microsoft.com/, [Accessed Jan. 13, 1999].
Intel Corporation "Home" Webpage: http://www.intel.com/, [Accessed Jan. 13, 1999].
Compaq Corporation "Home" Webpage: http://www.compaq.com/smb/ [Accessed Jan. 13, 1999].

* cited by examiner

*Primary Examiner*—Kim Vu
*Assistant Examiner*—Tam V Nguyen
(74) *Attorney, Agent, or Firm*—Dorsey & Whitney LLP (57) ABSTRACT

Methods for of providing computer systems bundled with access to restricted-access databases. In one embodiment, a method includes providing a computer system with an authorized access identifier that allows access to a restricted-access database via a computer communication network; and providing the computer system to a user. The user is not required to pay use fees, or seek out a suitable information supplier, thereby improving user satisfaction and productivity. In an alternate embodiment, a method includes providing an access software program for accessing the restricted-access database. In another embodiment, a method includes generating the restricted-access database. Alternately, the generating of the restricted-access database may include storing educational information on a storage device, or transmitting an approximately real-time audio-visual signal. In another embodiment, a method includes updating the restricted-access database. In yet another embodiment, a method includes receiving an access identifier signal via the communication network, and comparing the access identifier signal with the authorized access identifier. In another embodiment, a method includes receiving a selection signal from the user indicative of a desired information, and transmitting the desired information to the user. In a further embodiment, a method includes obtaining access rights to a restricted-access database from an educational information supplier; and providing a computer system with an access identifier that allows a user to access the restricted-access database via a communication network.

22 Claims, 11 Drawing Sheets

METHODS OF PROVIDING COMPUTER SYSTEMS WITH BUNDLED ACCESS TO RESTRICTED-ACCESS DATABASES

TECHNICAL FIELD

The present invention relates to methods of providing computer systems having bundled access to restricted-access databases.

BACKGROUND OF THE INVENTION

Generally speaking, people who are properly trained are more satisfied and more productive in their work. People from all fields—science, business, engineering, education, social services, etc.—seek training to enhance their existing skills, or to develop new skills. In every field of industry, workforce training is usually a high priority.

Computer users typically have a wide variety of computer savvy. Many have technical backgrounds and are familiar with the basics of computer hardware and software. Some are experts who are intimately familiar with one or more aspects of the computing sciences. Ever-increasing numbers of computer users, however, have little or no experience with, or understanding of, the computer systems they use. At every level of experience, people who use computer systems often desire training on how to better use their computer systems and related computer products.

Traditionally, training occurs within the confines of a classroom in an educational or industrial institution, such as a university lecture hall or a company training facility. In such "brick and mortar" facilities, students gather at desks to be taught by an instructor. Due to limited availability of instructors, and limited classroom space, this method of training is conducted on a rigidly maintained schedule, and class sizes are restricted to a limited number of students. Typically, students (or their employers) are charged fees in accordance with the amount of training provided.

Efforts have been made to accommodate the growing numbers of people who desire training. For example, class sizes have been expanded by offering televised instruction wherein an instructor's lecture is broadcast for limited periods at scheduled times over a limited broadcast area. Alternately, lectures are recorded on audio-visual media and are stored at a facility, such as a public or private library, for access by students during scheduled operating hours. The audio-visual media may also be sold, allowing the consumer to access a limited amount of educational information at any time.

More recently, with the increasing availability and popularity of a global computer communication network (commonly referred to as the "Internet" or the "World Wide Web"), other methods of training, particularly computer science training, have evolved. For example, a number of suppliers of computer products have developed webpages that provide unrestricted-access to information directed to informing consumers about each supplier's particular computer-related products. Product-specific webpages include those provided by Micron Technology, Inc. indexed at www.micron.com, or by Microsoft Corporation indexed at www.microsoft.com, or by Intel Corporation at www.intel.com, or by Compaq Computer Corporation at www.compaq.com/smb/.

Figure 1:
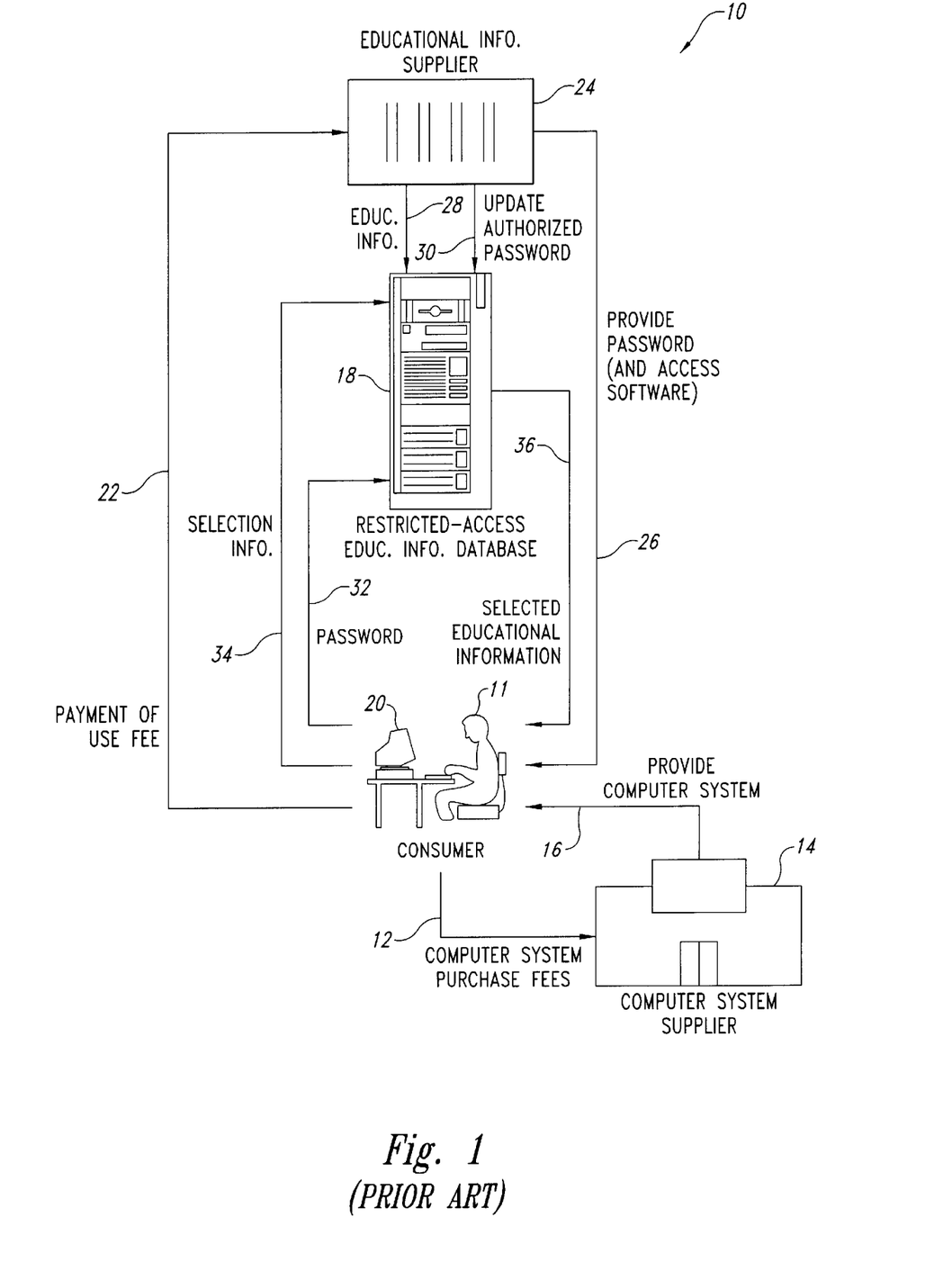
FIG. 1 is a schematic representation of a prior art method of providing a computer system and separately providing access to a restricted-access educational information database.

Another prior art method of providing computer science educational information via the global computer communication network is depicted in FIG. 1. In this embodiment, a method 10 includes a consumer 11 paying computer system purchase or rental fees 12 to a computer system supplier 14 which, in return, provides a computer system 16, 20 to the consumer 11. The consumer 11 then pays a use fee 22 to an educational information supplier 24 to access a restricted-access database of educational information 18. The amount of use fee paid by the consumer is typically proportional to either the amount of educational information accessed, or the period of time the database is accessed, by the consumer. In exchange for the use fee, the educational information supplier 24 provides a password (and access software if necessary) 26 to the consumer 11. The consumer 11 transmits the password and accesses the restricted-access educational information database using the computer system 20 via the global computer communication network (ie. "online" access).

Typically, the educational information supplier 24 stores educational information 28 in the database 18 for access by authorized consumers at a later time. Alternately, the educational information supplier 24 may provide the educational information 26 in a "real-time" fashion, such as by approximately instantaneous audio-visual transmissions similar to a television broadcast. Such real-time transmissions may be routed through the educational information database 18, and may be interactive between the consumer 10 and an instructor. The educational information supplier 24 also provides authorized password information 30 to the educational information database 18 to permit or deny access to the database appropriately.

Using the computer system 20, the consumer 11 transmits their authorized password 32 over a communication link (e.g. the global computer communication network) to gain online access to the restricted-access educational information database 18. The consumer 11 then chooses which educational information they wish to receive, and transmits selection information 34 to the restricted-access educational information database 18. The database then transmits the selected educational information 36 to the consumer's computer system 20. The foregoing method 10 (or variations thereof) is used, for example, by educational information supplier Ziff-Davis, Inc. as described in part at www.ziffdavis.com/education_index.htm.

The prior art methods have several disadvantages. For example, in addition to the purchase fees paid by the consumer for the computing system 20, the consumer must also pay the use fee for access to the restricted-access educational information database 18, leading to consumer dissatisfaction. Typically, the pay structure of the prior art training methods requires that the user/trainee pay fees in direct proportion to the amount of training received, which deters may users from pursuing training despite its availability.

Although a limited amount of information is available on an non-fee basis via the webpages of computer product suppliers, the content of these sources is characteristically oriented toward marketing, advertising, and basic troubleshooting of the supplier's computer products. These sources generally do not provide comprehensive educational information, nor do they provide interactive "real-time" training presently available on a restricted-access, pay-per-view basis. The adage "you get what you pay for" strongly applies to the prior art methods.

Furthermore, existing methods necessitate that, after purchasing a computer system, the consumer who desires on-line training must seek out an educational information provider. Because consumers are typically uninformed of the quality and availability of educational information suppliers, consumer frustration and dissatisfaction is increased. Also, the educational information provided by the educational information supplier may not be compatible with the user's computer system, resulting in additional loss of productivity, expense, and frustration for the user.

SUMMARY OF THE INVENTION

The present invention is directed toward methods of providing computer systems with bundled access to restricted-access databases. In one embodiment, a method in accordance with the invention includes providing a computer system with an authorized access identifier that allows access to a restricted-access educational information database via a computer communication network; and providing the computer system to a user. The user is not required to pay use fees, or seek out a suitable educational information supplier. In this way, the user is immediately and conveniently included into a community of students and instructors in an online university environment, enhancing the user's knowledge, productivity, and satisfaction.

In an alternate embodiment, a method includes providing an access software program for accessing the restricted-access database via the communication network. The access software program resides on the user's computer system and communicates with a database software program that resides on the restricted-access database.

In another embodiment, a method includes generating the restricted-access database. Alternately, the generating of the restricted-access database may include storing educational information on a storage device, or transmitting an approximately real-time audio-visual signal. In another embodiment, a method includes updating the restricted-access database.

In yet another embodiment, a method includes receiving an access identifier signal via the communication network, and comparing the access identifier signal with the authorized access identifier. These "access control" steps may be performed by the restricted-access database, or independently therefrom. In another embodiment, a method includes receiving a selection signal from the user indicative of a desired information, and transmitting the desired information to the user. Similarly, these "information management" steps may be performed by the restricted-access database, or independently therefrom.

In still another embodiment, a method includes providing a computer system with an authorized access identifier; providing rights to access a restricted-access database of information accessible via a communication network using the authorized access identifier; receiving an identifier input signal via the communication network; comparing the identifier input signal with the authorized access identifier; allowing access to the restricted-access database when the identifier input signal matches the authorized access identifier; receiving a selection signal indicating a desired data; and transmitting the desired data via the communication network.

In a further embodiment, a method includes obtaining access rights to a restricted-access educational information database from an educational information supplier; and providing a computer system with an access identifier that allows a user to access the restricted-access educational information database via a communication network. In another embodiment, a method includes informing the educational information supplier of the authorized access identifier. In yet another embodiment, a method includes providing a consideration to the educational information supplier for the access rights.

DETAILED DESCRIPTION OF THE INVENTION

The following description is generally directed toward methods of providing computer systems with bundled access to restricted-access databases. Many specific details of certain embodiments of the invention are set forth in the following description and in FIGS. 2–8 to provide a thorough understanding of such embodiments. One skilled in the art, however, will understand that the present invention may have additional embodiments, or that the present invention may be practiced without several of the details described in the following description.

Figure 2:
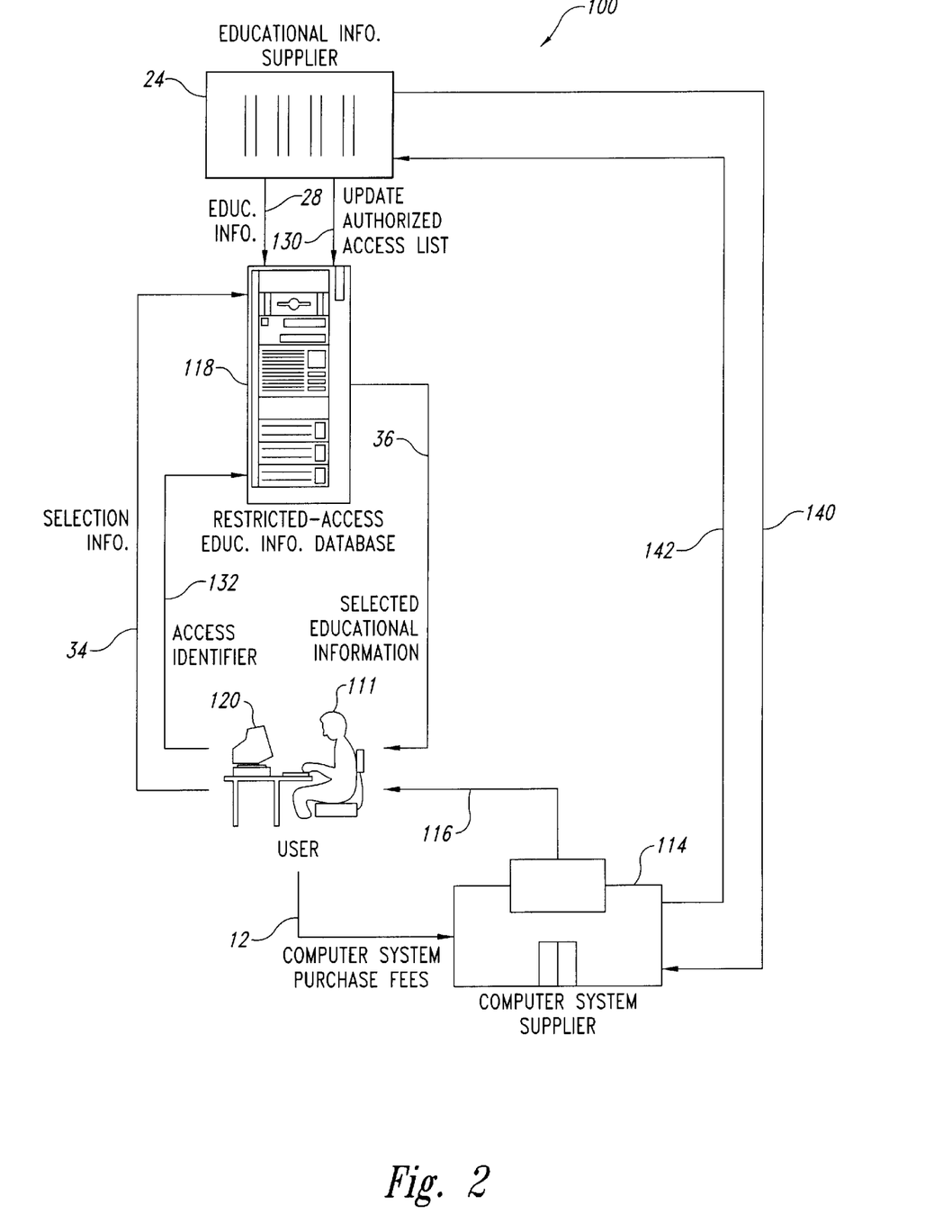
FIG. 2 is a schematic representation of an embodiment of a method of providing a computer system with bundled access to a restricted-access educational information database in accordance with the present invention.

FIG. 2 is a schematic representation of an embodiment of a method 100 of providing a computer system with bundled access to a restricted-access educational information database in accordance with the present invention. FIG. 3 is a flowchart representation of the method 100 of FIG. 2. In this embodiment, the method 100 includes a computer system supplier obtaining access rights 140 to a restricted-access educational information database from an educational information supplier. The access rights may be obtained in a variety of ways, including, for example, by exchanging a payment or other consideration for the access rights.

A user 111 then pays a purchase or rental fee 12 to the computer system supplier 114. In return, the computer system supplier provides a computer system 120 having an access identifier that allows the user to access the restricted-access database of educational information 116. The computer system supplier 114 then notifies the educational information supplier of the access identifier 142 that has been provided to the user 111 along with the computer system 120. The educational information supplier 24 adds the access identifier to a list of authorized access identifiers 130, thereby allowing the user 111 to access the restricted-access educational information database 118.

In an alternate embodiment, the educational information supplier 24 could provide one or more access identifiers to the computer system supplier 114 that have been pre-authorized to access the restricted-access database 118. For example, the educational information supplier 24 could add a quantity of access identifiers to the list of authorized access identifiers 130, and then sell the quantity of access identifiers to the computer system supplier 114 for a purchase fee. The computer system supplier 114 could then provide the computer system with one of the authorized access identifiers to the user 111, and the user 111 would have the desired access to the restricted-access educational information database 118.

Figure 3A:
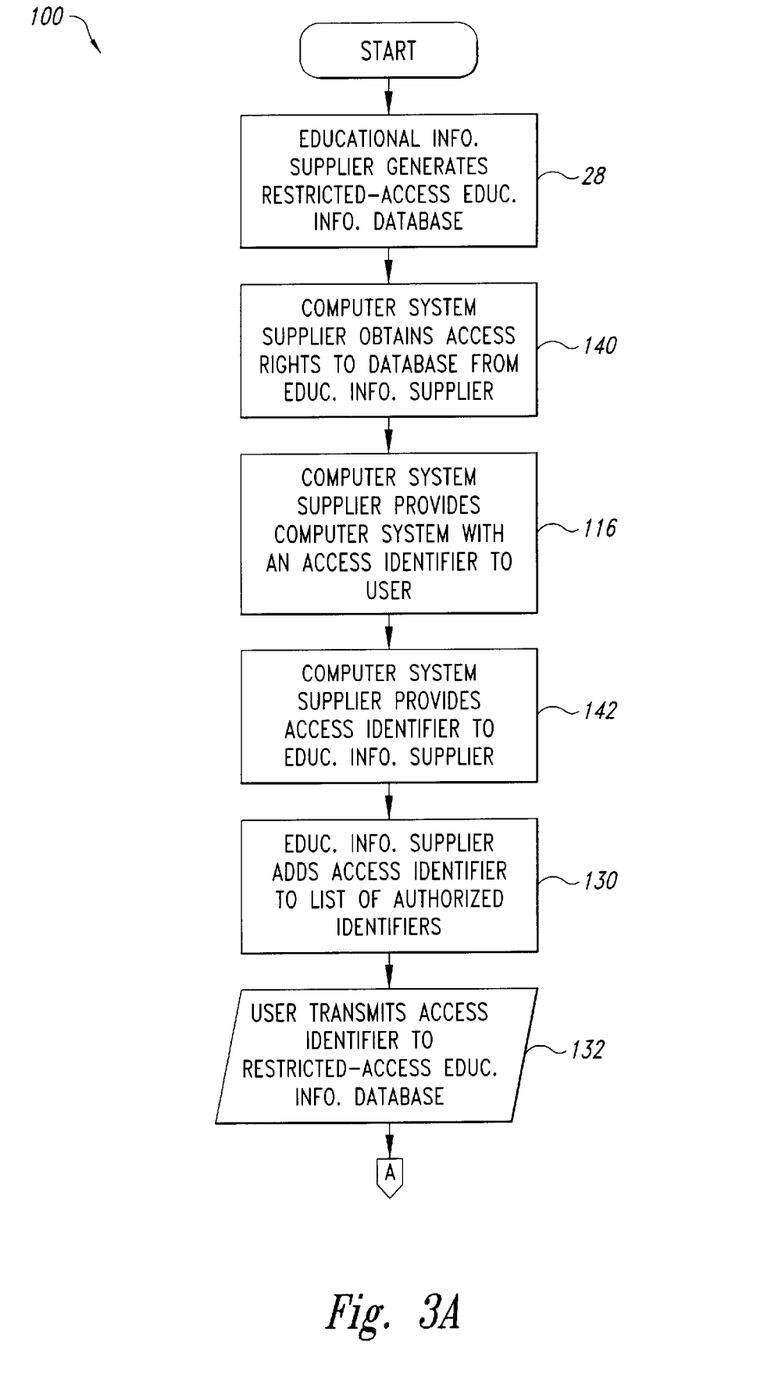
FIG. 3 is a flowchart representation of the method of FIG. 2.

As shown in FIG. 3A, the educational information supplier initially creates the restricted-access educational information database 118 prior to the user 111 purchasing the computer system. The educational information supplier 24 then periodically updates the restricted-access educational information database 28. In alternate embodiments, the restricted-access database may be updated by other entities, such as, for example, by the computer system supplier 114. The updating of the restricted-access database may be accomplished, for example, in "real-time" fashion, such as by approximately instantaneous audio-visual transmissions, preferably for interactive learning by the user. Alternately, the restricted-access database need not be updated at all.

In operation, the user requests access to the restricted-access database 118 by using the computer system 120 to transmit the access identifier 132 to the restricted-access educational information database 18 over a communication network. The communication network may be any type of communication network suitable for sending and receiving digitized signals, such a telephone line, an RF or microwave link, or the Internet. The restricted access database 118 receives the access identifier and compares it with a list of authorized access identifiers 117 (see FIG. 3B). If the user's access identifier is not authorized, the restricted-access database 118 notifies the user that the access identifier is not authorized and request re-transmission of the access identifier, or simply terminates the connection 119.

Figure 3B:
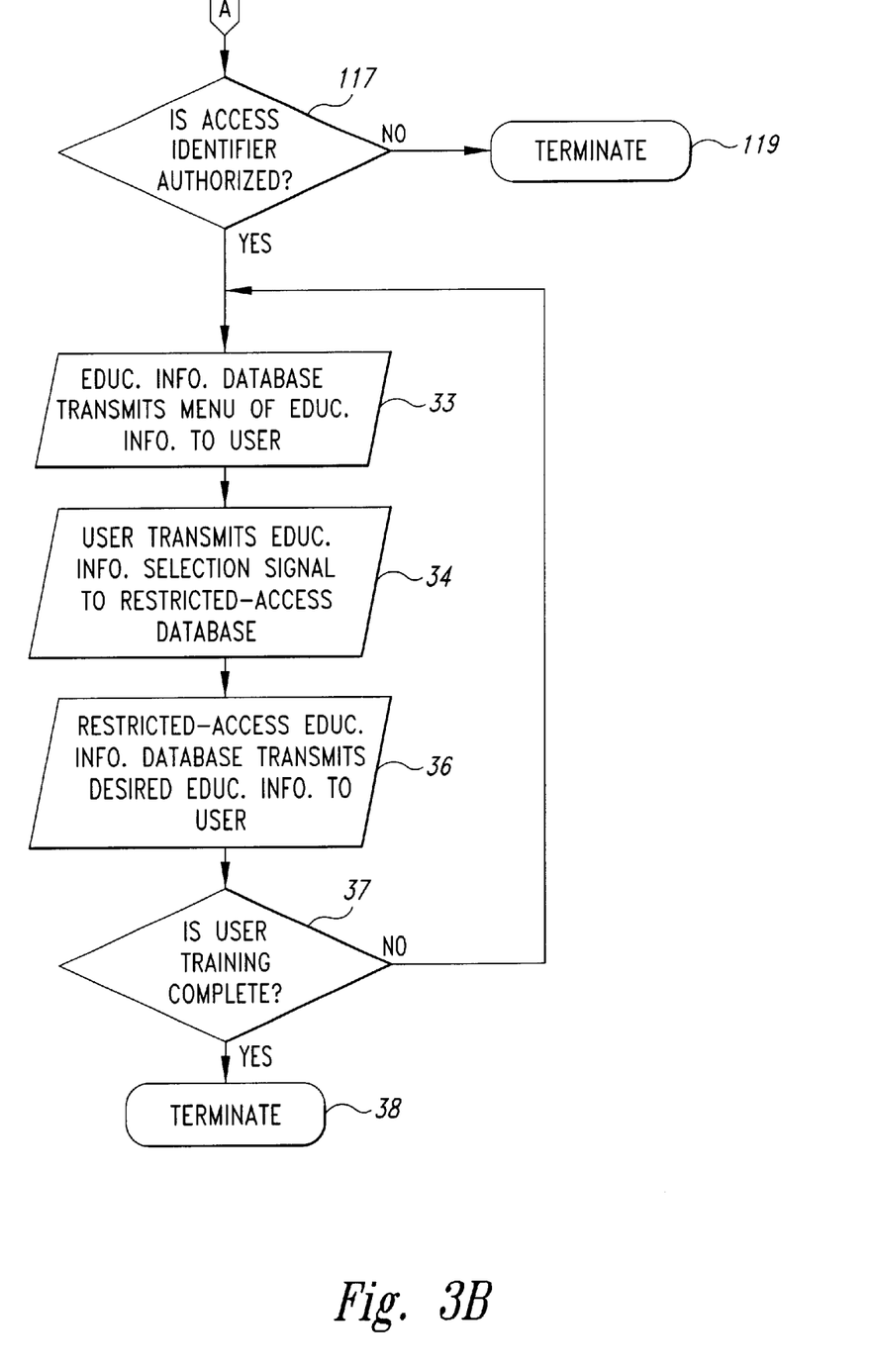

If the user's access identifier is authorized, the restricted-access database 118 transmits a menu of available educational information to the user. The user 111 then chooses which educational information they wish to receive, and transmits a selection signal 34 to the restricted-access database 118. The restricted-access database 118 transmits the selected educational information 36 to the user's computer system 120. The restricted-access database 118 then inquires whether the user is finished training 37, and if not, the menu of available educational information is retransmitted to the user's computer system 33, and the remaining steps of the method are repeated. If the user is finished training, the session is terminated 38.

Although the foregoing embodiment specifies that the steps of receiving the access identifier from the user 132 and comparing the user's access identifier with the list of authorized access identifiers 117 are performed by the restricted-access database, these steps could easily be performed independently from the restricted-access database. For example, these "access control" steps could be performed by the educational information supplier 24, or by the computer system supplier 114. Similarly, the "information management" steps of transmitting the menu of available educational information to the user 33, receiving the user's selection signal 34, and transmitting the selected educational information to the user 36 could also be performed independently from the restricted-access database. For example, these information management steps could be performed by the educational information supplier 24 who simply retrieves the selected educational information from the restricted-access database 118 in response to the user's selection signal.

The methods described above advantageously provide the computer system 120 having bundled access to the restricted-access educational information database 118, allowing the user immediate, automatic access to a free, comprehensive, ongoing university or training curriculum contained in the restricted-access database. The user is not required to seek out a suitable educational information provider, or pay use fees for the training received. Because training is quickly and efficiently provided, the user may easily acquire the desired training, thereby increasing the user's productivity and satisfaction.

Another advantage of the foregoing methods is that they provide users with training convenience. Having access to on-line training bundled with the user's computer system provides enhanced convenience through randomly accessible information, flexible class times, and self-paced tutorials. This "virtual classroom" environment enables the user to train wherever the user's computer system with bundled access is located, including from a stationary personal computer or portable notebook computer. Due to the computer system's bundled access to the restricted-access database, the methods permit the user to login at any time using the computer system, to read assignments, post questions, and exchange ideas with instructors or fellow students. In this way, the user is immediately and conveniently included into a community of students and instructors in an online university environment, enhancing the user's knowledge and satisfaction.

Figure 4:
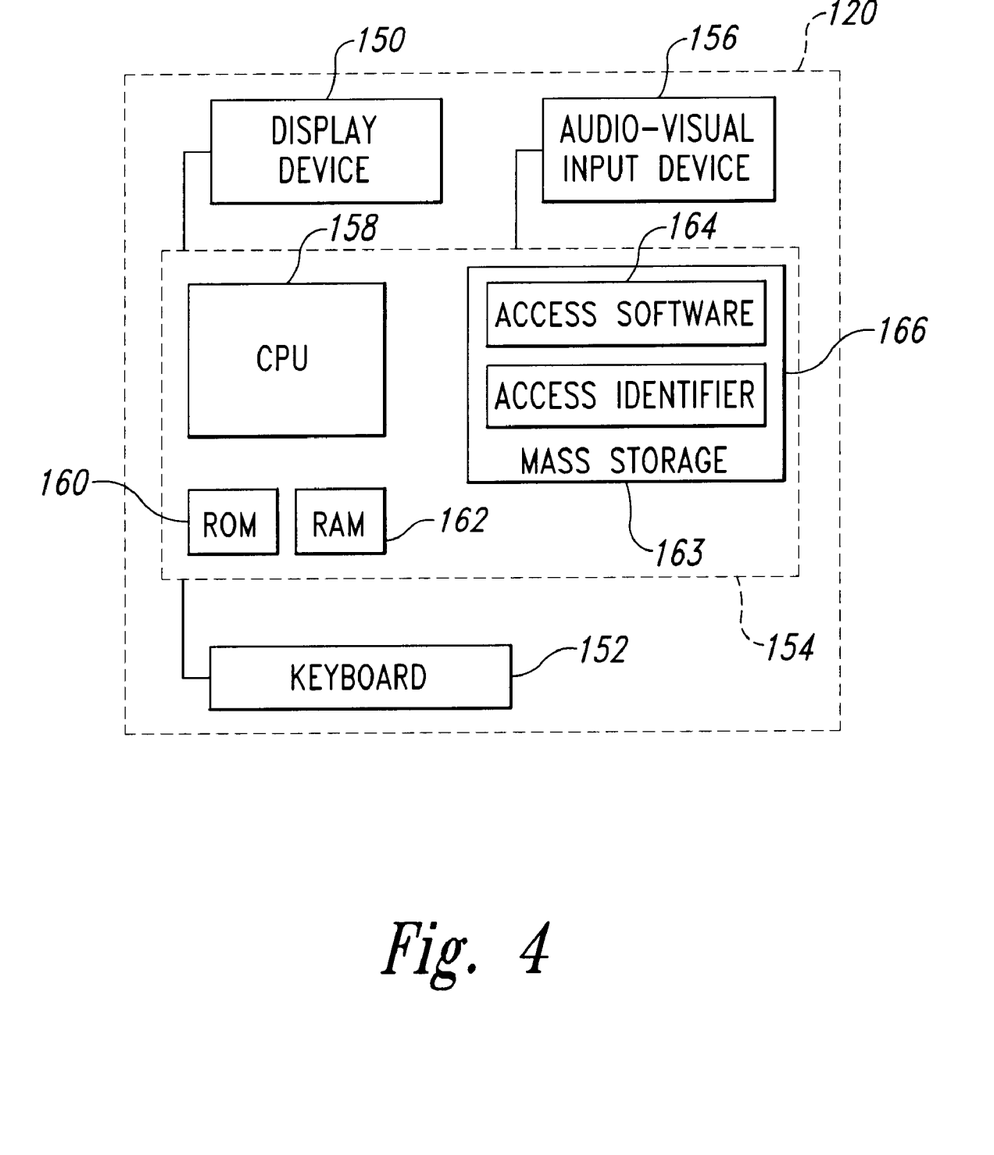
FIG. 4 is a schematic representation of an embodiment of an architecture of the computer system of FIG. 2.

FIG. 4 is a schematic representation of an architecture of an embodiment of the computer system 120 of FIG. 2. In this embodiment, the computer system 120 includes a display device 150 and a keyboard 152 operatively coupled to a computing platform 154. The computing system 120 may also include an audio-visual input device 156 operatively coupled to the computing platform 154, preferably for inputting audio-visual signals from the user 111 for interactive learning operations. The computing platform 154 shown in FIG. 4 includes a CPU (i.e. Central Processing Unit) 158 operatively coupled to a ROM (i.e. Read-Only Memory) device 160, and also operatively coupled to a RAM (i.e. Random-Access Memory) device 162. Finally, the computing platform 154 includes a mass storage device 163, such as a disk drive, containing software and an access software program 164, and an access identifier 166. Alternatively, the access software program 164 and the access identifier 166 may be stored in the ROM 160.

One may note that some of the elements of the embodiment of the computing system 120 shown in FIG. 4 may be eliminated or combined. For example, the audio-visual input device 156 may be eliminated, particularly if the user 111 does not desire interactive learning capability. Alternately, the keyboard 152 may be eliminated if the user 111 chooses to input all information using the audio-visual input device 156. The display device 150 and keyboard 152 may be eliminated if, for example, the user 111 chooses to use compatible components from another system or computer system supplier. Also, the configuration of the computer platform 154 may be altered in a wide variety of ways, such as, for example, by elimination of the access software 164.

It is also apparent that the access identifier 166 may be provided in the computing system 120 in different ways. For example, the access identifier 166 may include an alphanumeric character string (i.e. a password) pre-installed within the ROM 160 of the computing platform 154 as depicted in FIG. 4. Alternately, the access identifier 166 may simply be provided to the user 111 on a printed card for input by the user 111 when prompted by the restricted-access database 118. Furthermore, the access identifier 166 may be hardware specific, such as a serial number of the CPU 158 (e.g. the serial number on an Intel Pentium III processor), thereby allowing the user to access the restricted-access database 118 only from the computing platform 154 purchased from the computer system supplier 120.

FIG. 5 is a flowchart representation of an embodiment of an access software routine 200 of the access software 164 of FIG. 4. In general, the access software routine 200 performs a number of processing steps, each of which is well within the knowledge and understanding of persons of ordinary skill in the art of writing computer programs. Furthermore, the access software routine 200 depicted on FIG. 5 represents one possible embodiment, and many different alternative routines are conceivable that can operate to perform the desired steps and functions described below.

The access software routine 200 begins by transmitting a connect signal 202 to the restricted-access educational information database. The access software routine 200 then receives and displays a login inquiry 204 from the restricted-access database. In response, the access software routine 200 transmits the access identifier to the restricted-access educational information database 206. The access identifier may be input in a variety of ways, including, for example, by being read from storage from the ROM of the computer system and transmitted automatically by the CPU, or by input by the user.

Access to the restricted-access database is either allowed or denied 208 based on a comparison between the access identifier and a list of authorized access identifiers. In this embodiment, the comparison is performed by a database software routine operating on a remote computer where the restricted-access database is stored (described below). If access is not allowed, the access software routine 200 either (1) repeats the steps of receiving and displaying the login inquiry 204, and transmitting the access identifier to the restricted-access database 206, or (2) the connection with the restricted-access database is simply terminated 210, such as, for example, if the user has unsuccessfully attempted to access the database an excessive number of times 209 (shown in FIG. 5A).

If access to the restricted-access database is allowed, the access software routine 200 receives and displays a menu of available educational information 212 from the restricted-access database. The access software routine 200 then transmits a selection signal 214 input by the user to the restricted-access database representing the user's choice of the available educational information. In the embodiment shown in FIG. 5, the software routine 200 then determines whether the user has selected an interactive mode of learning 216. Alternately, this determination could be performed, for example, by the restricted-access database, and then communicated to the access software routine 200.

If the user's selection signal indicates that the user has not selected the interactive learning mode, the access software routine 200 receives and displays the selected educational information 218. Then, the access software routine 200 determines whether user training is complete 220, such as by receiving a prompt from the restricted-access database and monitoring the user's response thereto. If user training is complete, the operation of the access software routine 200 is terminated 222. If not, the software routine 200 returns to the step of receiving and displaying the menu of available educational information 212 from the restricted-access database, as shown in FIG. 5. The access software routine 200 is then repeated from that point until the user training is complete and operation of the routine is terminated 222.

Figure 5A:
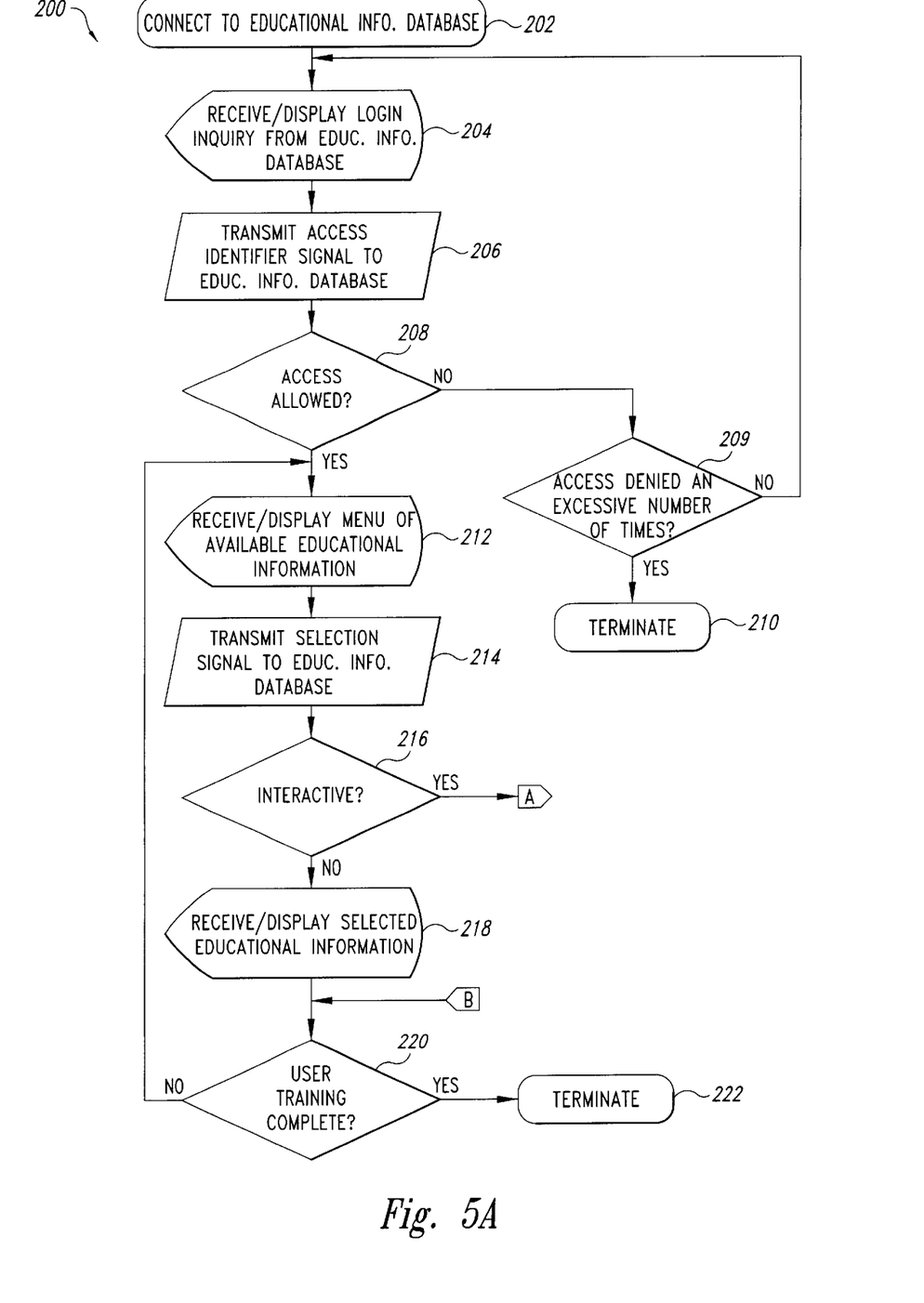
FIG. 5 is a flowchart representation of an embodiment of an access software routine of the access software of FIG. 4.
Figure 5B:
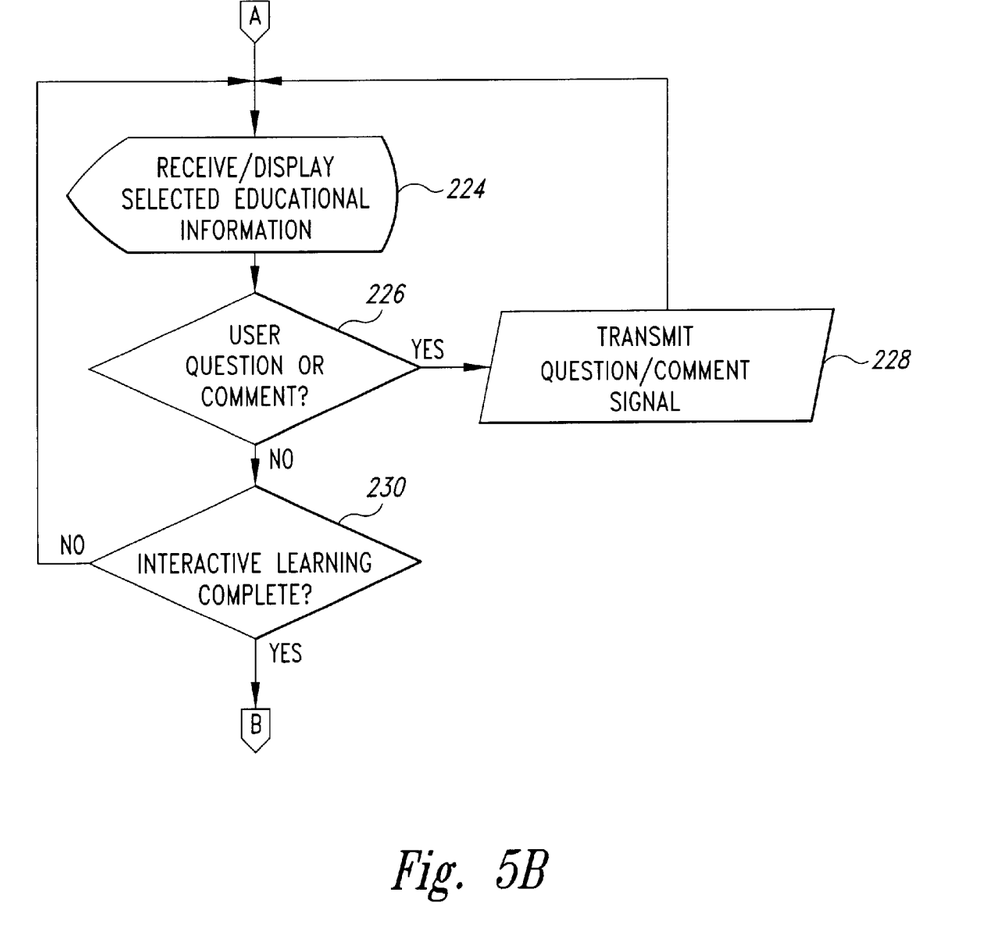

If the user's selection signal represents the interactive learning mode, the access software routine 200 receives and displays the selected educational information interactively 224 as shown in FIG. 5B. The access software routine 200 determines whether the user has any questions or comments 226, and if so, transmits a user's questions or comments signal 228 to the restricted-access database. The steps of interactively receiving and displaying educational information (i.e. a response to the user's question or comment) 224, determining whether the user has any additional questions or comments 226, and if so, transmitting the additional questions or comments signal 228, are then repeated indefinitely until the user has no more questions or comments.

The access software routine 200 then determines whether the interactive learning mode is complete 230, and if not, returns to the step of interactively receiving and displaying educational 224, and continues the routine from that point, as shown in FIG. 5. If the interactive mode of learning is complete 230, then the access software routine 200 proceeds to the step of determining whether the entire training session is complete 220, and continues from that point in the manner specified above.

Figure 6A:
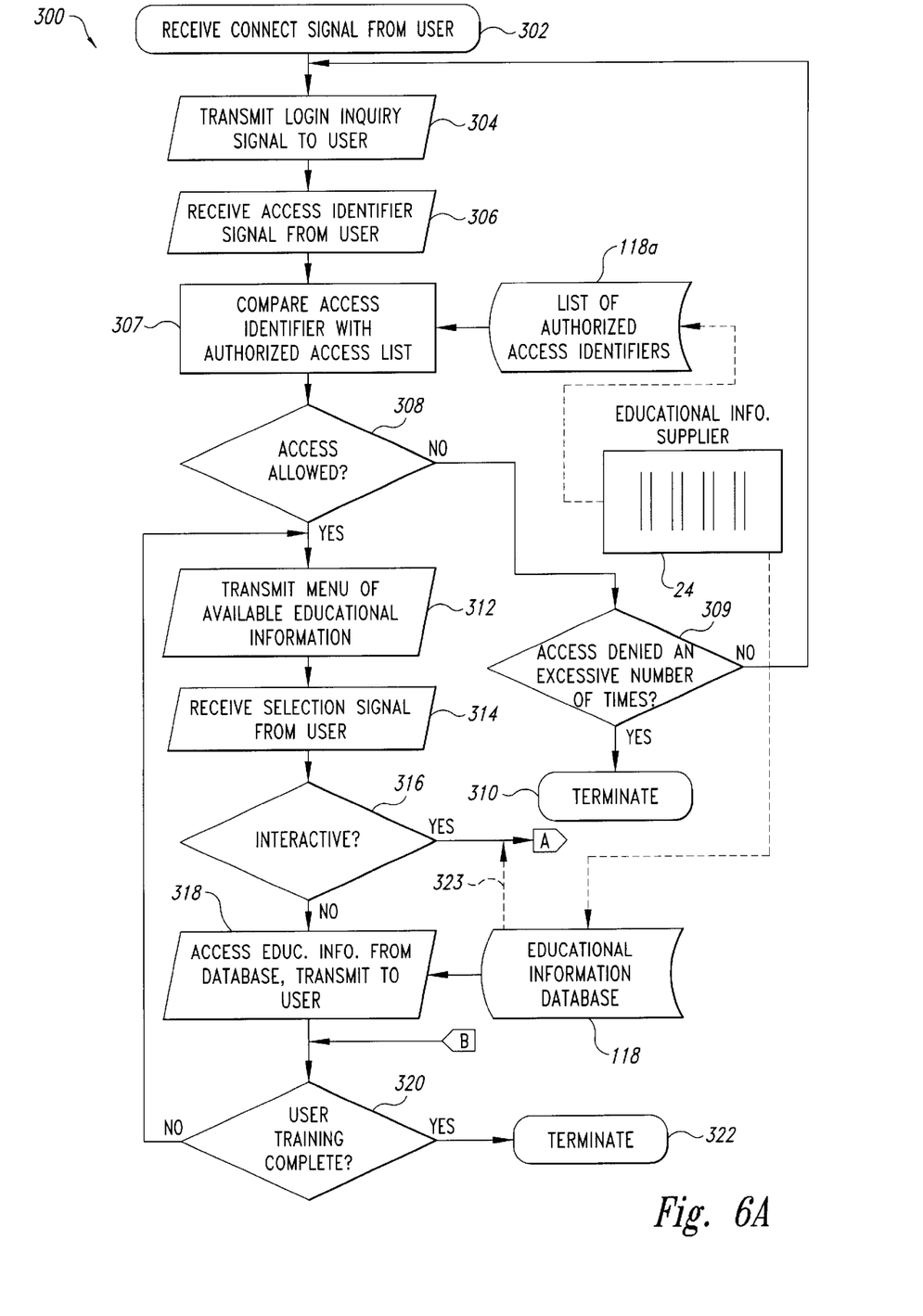
FIG. 6 is a flowchart representation of an embodiment of a restricted-access database software routine of FIG. 2.
Figure 6B:
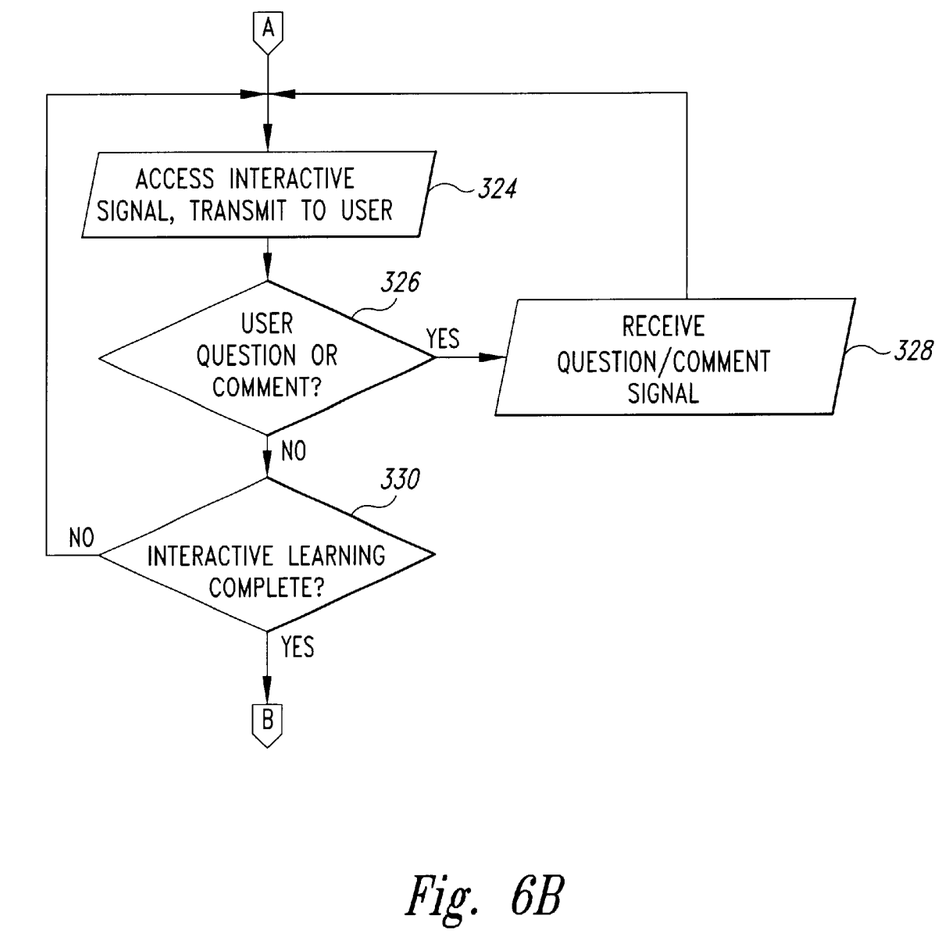

FIG. 6 is a flowchart representation of an embodiment of a restricted-access database software routine 300 of FIG. 2. As with the access software routine 200 described above, the database software routine 300 performs processing steps, each of which is well within the knowledge and understanding of persons of ordinary skill in the art of writing computer programs. Also, the database software routine 300 depicted on FIG. 6 represents one possible embodiment, and many different alternative routines are conceivable that operate to perform the steps and functions described below.

The database software routine 300 begins by receiving a connect signal 302 from the user 111 requesting access to the restricted-access database 118. The database software routine 300 then transmits the login inquiry to the user 304. Next, the database software routine 300 receives the access identifier transmitted by the user 306, and compares the user's access identifier with a list of access identifiers 307 authorized to access the restricted-access database 118. In the embodiment of the database software routine 300 shown in FIG. 6, the authorized access list 118b is generated and maintained by the educational information supplier 24. The authorized access list 118b may, however, be generated and maintained in numerous ways, including, for example, by the computer system supplier 114, or by a third party, or by a combination thereof Based on the foregoing comparison 307, the database software routine 300 determines whether access to the restricted-access database is either allowed or denied 308. If access is not allowed, the database software routine 300 either (1) repeats the steps of transmitting the login inquiry to the user 304, receiving the access identifier transmitted by the user 306, and comparing the user's access identifier with a list of access identifiers 307, or (2) the connection with the restricted-access database is simply terminated 310, such as, for example, if the user has unsuccessfully attempted to access the database an excessive number of times 309 (shown in FIG. 6A).

If access to the restricted-access database is allowed, the database software routine 300 transmits to the user a menu of educational information 312 available from the restricted-access database. The database software routine 300 then receives the selection signal from the user 314 representing the user's choice of the available educational information. The database software routine 300 then determines whether the user has selected an interactive mode of learning 316. As described above, this determination could be performed by the user's access software routine 200 and then communicated to the database software routine 300.

In the event that the user has not selected the interactive learning mode, the database software routine 300 accesses the user-selected educational information from the educational information database 118 and transmits this information to the user 318. In the embodiment shown in FIG. 6, the educational information database 118 is depicted as being generated and maintained by the educational information supplier 24. As with the authorized access list 118b (which may be a portion of the database 118) the educational information database 118 may be generated and maintained in a variety of ways. For example, the database might initially be generated by the educational information supplier 24, but then may be maintained and updated by the computer system supplier 114, or by one or more third parties, or by any combination thereof. Furthermore, the educational information database 118 need not be a mere static collection of information, but rather, may preferably be a dynamic assembly of the latest information in the field of computer sciences, or any other field (art, science, business, engineering, education, social services, etc.), and may include text and graphics information, and interactive and non-interactive audio-visual transmissions.

As further shown in FIG. 6, the database software routine 300 next determines whether user training is complete 320. This determination may be made in a variety of ways, including, for example, by sending an inquiry to the user and monitoring a response thereto, or simply by receiving a quit signal from the access software routine 200. If user training is complete, the connection between the database software routine 300 and the user's access software routine 200 is terminated 322. If user training is not complete, the database software routine 300 returns to the step of transmitting the menu of available educational information to the user 312. As shown in FIG. 6, the database software routine 300 is then repeated from that point until user training is complete and connection is terminated 322.

In the event that the user has selected the interactive learning mode, the database software routine 300 accesses a user-selected interactive signal 323 and transmits the signal to the user 324. Although the interactive signal 323 is shown in FIG. 6 as being relayed through the educational information database 118, it is possible that the interactive signal 323 may be accessed by the database software routine 300 from a variety of sources, such as, for example, directly from the educational information supplier 24 or the computer system supplier 114.

In the interactive mode of learning, the database software routine 300 determines whether the user has any questions or comments 326, and if so, receives the user's questions or comments signal 328, and relays the questions or comments signal to a source of the interactive signal 323 (ie. an instructor) for a response. The database software routine 300 then returns to the step of accessing the user-selected interactive signal 323 and transmitting the signal, which preferably includes a response (if any) to the user's question or comment, to the user 324. The database software routine 300 then determines whether the user has any additional questions or comments 326, and if so, transmits the additional questions or comments signal 328 to the source of the interactive signal. As shown in FIG. 6, these steps are repeated indefinitely until the user has no more questions or comments.

The database software routine 300 then determines whether the interactive learning mode is complete 330, and if not, returns to the step of accessing and transmitting the user-selected interactive signal 324, and continues the routine from that point. As shown in FIG. 6, if the interactive mode of learning is complete, then the database software routine 300 returns to the step of determining whether the entire training session is complete 320, and continues from that point in the manner specified above.

Figure 7:
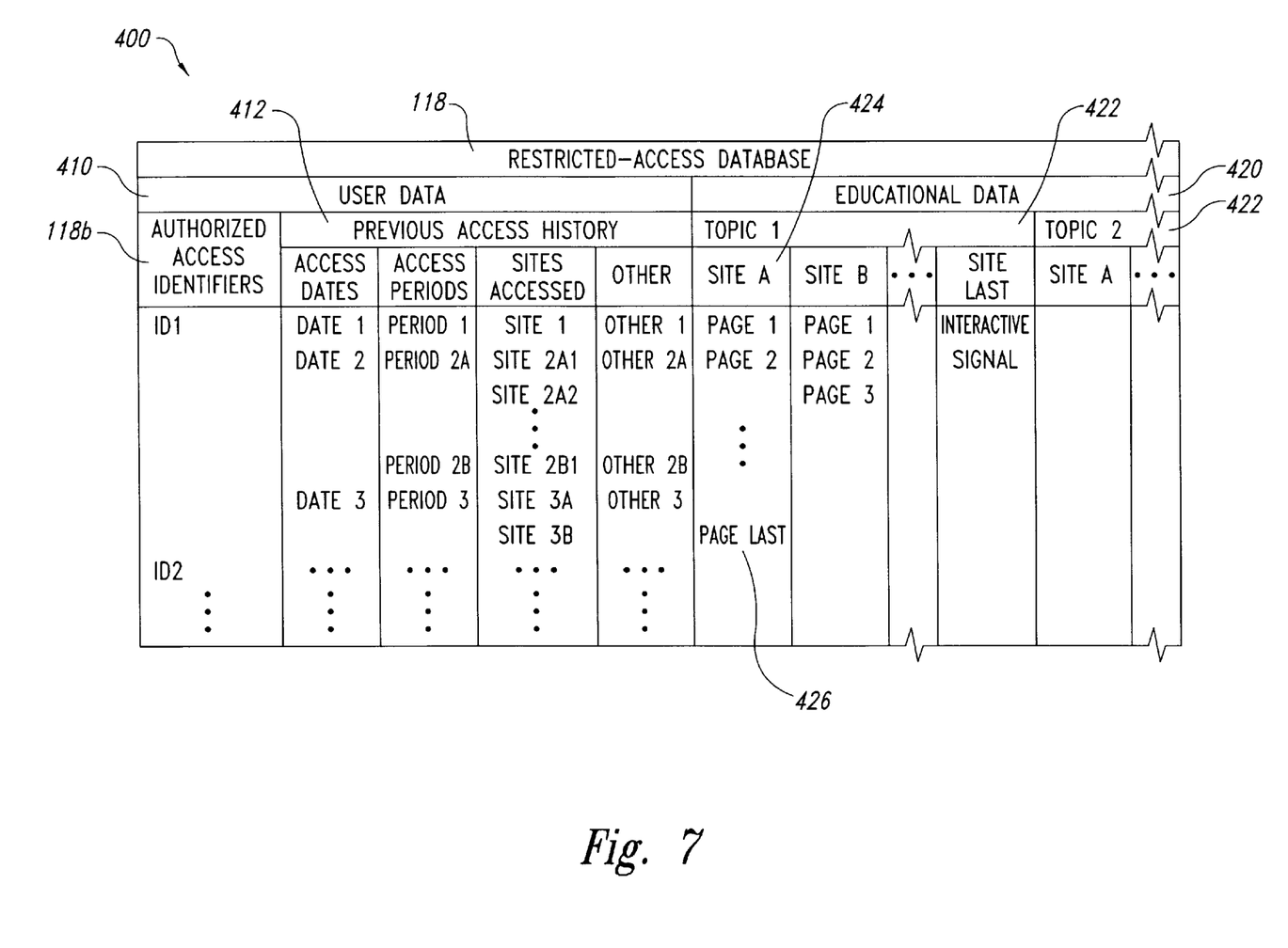
FIG. 7 is a schematic representation of an embodiment of a database structure of the restricted-access educational information database of FIG. 2.

FIG. 7 is a schematic representation of an embodiment of a database structure 400 of the restricted-access educational information database 118 of FIG. 2. The database structure 400 shown on FIG. 7 represents one of many possible embodiments that operate to perform the desired data-storage functions described below. In general, database structures are a well-known technology and are within the knowledge and understanding of persons of ordinary skill in the art.

The database structure 400 of the restricted-access database 118 includes a user data section 410 and an educational data section 420. The user data section 410 includes the list of authorized access identifiers 118b that is used by the database software routine 300 to permit or deny access to the restricted-access database 118. The user data section 410 also includes a previous access history section 412 that stores user-related metrics such as prior access dates, access periods, sites accessed, or other desired data. These data may be used for numerous purposes, including, for example, to allow the user to resume a self-paced tutorial. Alternately, the previous access history section 412 may be eliminated from the database structure 400, or the data may be stored independently. For example, previous access data might be stored on the user's computer system 120 and communicated with the restricted-access database 118 as data files (i.e. so-called "cookies") via the communication network.

The educational data section 420 contains one or more topic sections 422 into which educational information is categorized. Each topic section 422 has one or more site sections 424 that contain specific educational information relevant to each topic section 422. The site sections 424 include one or more pages 426 of educational information. The pages 426 may comprise alpha-numeric character data or audio-visual data, and preferably include audio-visual data that are received and transmitted in approximately real-time to the user's display device.

In operation, the database software routine 300 accesses the list of authorized access identifiers 118b to determine whether the user is authorized to access the educational data section 420. A monitoring routine (not shown) may be used to check the user's previous access history 412 and to make relevant determinations, such as, for example, whether the user has been interrupted and wishes to resume training at a previously-accessed site section 424. After the user has been allowed access to the restricted-access database 118, the database software routine 300 reads the topic sections 422 of the educational data section 420 and, as shown in FIG. 6, transmits the menu of available educational information 312 to the user. Upon receipt of the user's selection signal 314, the database software routine 300 accesses the user-selected site section 424 and transmits the pages 426 of educational information to the user.

The above-described methods of providing the computer system 120 having bundled access to the restricted-access educational information database 118 have several advantages over the prior art. For example, the foregoing methods eliminate the need for the user to haphazardly seek out and "test drive" educational information providers that may or may not provide educational information compatible with the user's computer system. These actions are eliminated because appropriate arrangements can be made ahead of time between computer system suppliers and educational information suppliers to provide the computer system with bundled access to educational information that is both relevant to, and compatible with, the user's computer system. The computer system having bundled access to the restricted-access database of educational information (including computer training and any other type of educational information) thereby enables the user to have on-line access to training in an efficient, cost-effective manner. In turn, user satisfaction is improved, and user productivity with the computer system is enhanced.

The user's access to on-line training is also improved because the additional use fees paid by the consumer to the educational information provider are eliminated. In the method 100 of the invention, the user simply pays a purchase fee to the computer system supplier, and access to the restricted-access educational information database is granted. User efficiency, satisfaction, and productivity are thereby improved.

In one embodiment of the method, the user is granted permanent, unlimited access to the database. In alternate embodiments, the user's free access may be limited to a specified period of time (e.g. one year of free access), or to a specified amount of access time (e.g. one hundred hours of free access), or to a specified amount of educational data (e.g. access only to designated topics in the database structure). For such alternate embodiments, the bundled automatic free-of-charge access to the restricted-access database is initially included within the purchase fee, and continued access is provided on a flat-fee arrangement.

The above-described methods provide comprehensive, ongoing university or training curriculum, preferably designed to empower the user to better leverage technology into their lives and business pursuits, by providing a computer system having bundled access to a restricted-access educational information database. The user is not required to pay a separate use fees for the right to access this restricted-access training information, and having the access rights bundled with the computer system improves efficiency of the training system for both the user and, in some cases, the user's employer.

Figure 8:
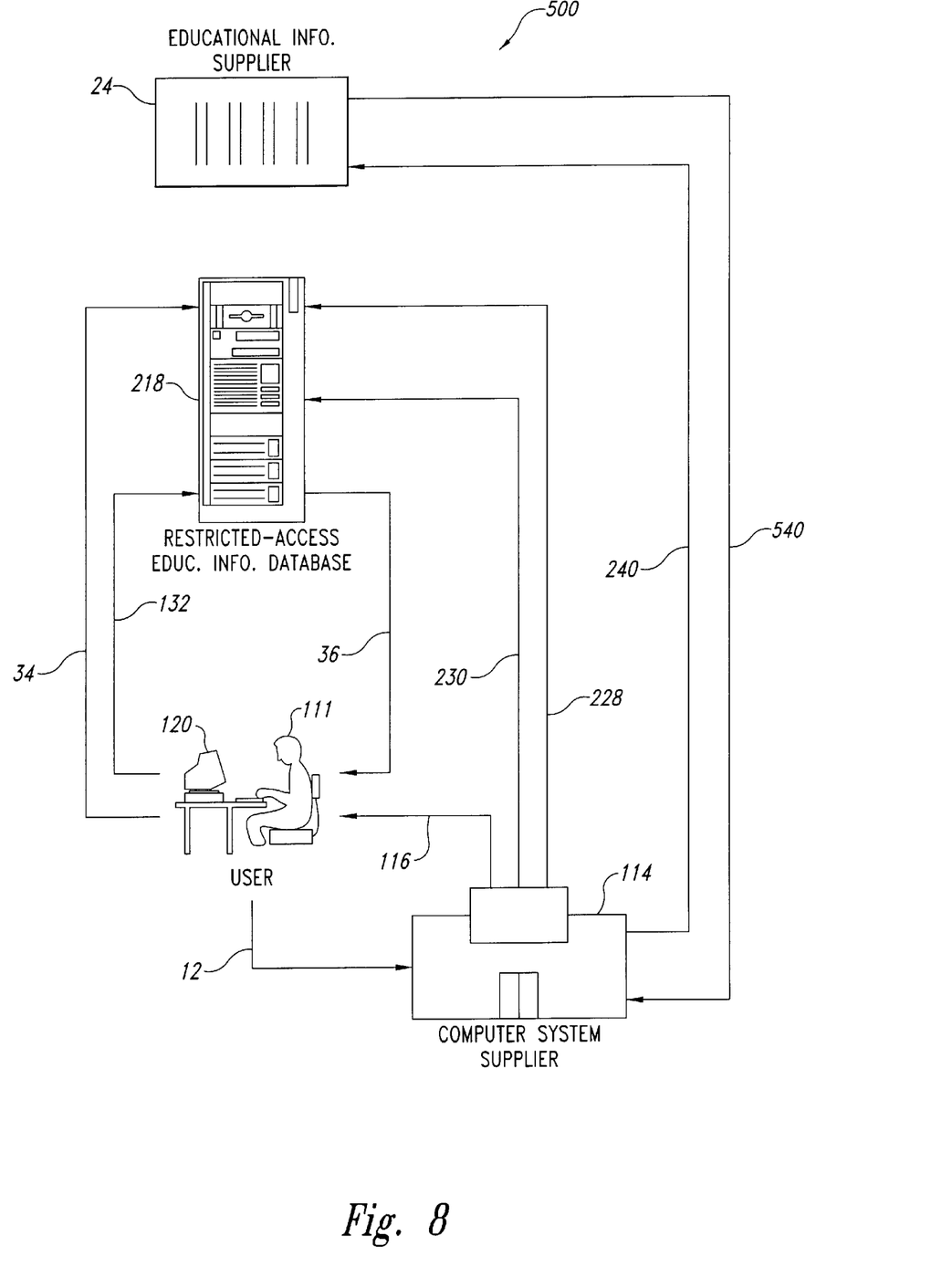
FIG. 8 is a schematic representation of an alternate embodiment of a method of providing a computer system with bundled access to a restricted-access educational information database.

FIG. 8 is a schematic representation of an alternate embodiment of a method 500 of providing a computer system 120 with bundled access to a restricted-access educational information database 218. Generally speaking, the steps of this method are similar to the above-described embodiment, except that the computer supplier 114 pays a purchase fee 240 to the educational information supplier 24, and in return, the educational information supplier 24 provides the restricted-access educational information database 218 to the computer system supplier 114.

After the computer system 120 is sold to the user 111, the computer system supplier 114 updates the list of authorized access identifiers 230 contained in the restricted-access database 218. The computer system supplier 114 also maintains and supplements the restricted-access database 228 to keep it up-to-date and useful for the user 111. The operations of the access software routine 200 (FIG. 5), the database software routine 300 (FIG. 6), and the database structure 400 (FIG. 7) are virtually unchanged, except that in FIG. 6, the computer system supplier 114 supplements the authorized access list and the restricted-access database rather than the educational information supplier 24.

The method 500 shown in FIG. 8 advantageously eliminates the continued involvement of the educational information supplier 24. After the initial payment 240 is made, and the initial restricted-access database 218 is provided 540 to the computer system supplier 114, the educational information supplier 24 is not involved in maintaining the authorized access identifier list 118b or the restricted-access database 118. Improved efficiency is achieved because the computer system supplier 114 directly updates the authorized access identifier list as the computer systems are sold.

In another alternate embodiment, the educational information supplier is completely eliminated from the process by having the computer system supplier 114 generate the original database rather than purchase it. This embodiment could result, for example, when the computer system supplier 114 develops its own restricted-access database, or when the computer system supplier 114 purchases (or merges with) the educational information supplier 24 (or vice versa) to create a single entity. The elimination of the educational information supplier 24 is transparent to the user 111.

Another advantage of the method 500 shown in FIG. 8 is that the computer system supplier 114 controls the educational content of the restricted-access database 118. This allows the computer system supplier 114 to tailor and optimize the content of the educational information to better match the supplier's products and systems, and to add the latest information to the restricted-access database 118 without waiting for the educational information supplier 24 to take action.

The embodiments described in the foregoing discussion are described in terms of providing computer systems having bundled access to restricted-access databases of "educational information," and preferably to "computer sciences" educational information. The methods of the invention, however, should not be construed as being limited only to computer-related educational information, nor should the methods of the invention be construed as being limited only to databases of "educational information."

Where the methods of the invention are used to provide access to restricted-access databases of educational information, the educational information may concern any imaginable field, including art, science, business, engineering, education, social services, and computers. Furthermore, the methods of the invention may be utilized to provide access to any type of restricted-access database of information, including those that are not "educational," such as, for example, credit information, property records, tax records, legal system archives, government archives, etc. Although in some sense, any type of information could be considered to be educational, the methods of the invention should be recognized as being applicable to providing computer systems having bundled access to restricted-access databases of any and all types of information.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part with prior art methods to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein of the invention can be applied to other methods of providing computer systems having bundled access to restricted-access databases, and not just to the methods described above and shown in the figures. In general, in the following claims, the terms used should not be construed to limit the invention to the specific embodiments disclosed in the specification and the claims, but should be construed to include all methods of providing computer systems that operate under the claims to include bundled access to restricted-access databases. Accordingly, the invention is not limited by the foregoing disclosure, but instead its scope is to be determined by the following claims.

What is claimed is:

1. A method of providing a computer user with access to a restricted-access database, comprising:
    providing a computer system to the computer user, the computer system having an authorized access identifier that allows access to the restricted-access database via a communication network, the authorized access identifier being a characteristic of the user's computer system and only allowing access to the restricted-access database from the computer system;
    receiving the authorized access identifier via the communication network;
    analyzing the authorized access identifier; and
    allowing access to the restricted-access database based on the authorized access identifier without analyzing an accessibility characteristic of a requested information stored in the restricted-access database and without analyzing a security characteristic of a communication path between the computer system and the restricted-access database.

2. The method of claim 1, further comprising providing an access software program for accessing the restricted-access database via the communication network.

3. The method of claim 1, further comprising obtaining the restricted-access database from an educational information supplier.

4. The method of claim 1, further comprising generating the restricted-access database.

5. The method of claim 4 wherein generating the restricted-access database comprises storing educational information on a storage device.

6. The method of claim 4 wherein generating the restricted-access database comprises transmitting an approximately real-time audio-visual signal.

7. The method of claim 1, further comprising updating the restricted-access database.

8. The method of claim 1, further comprising receiving an access identifier signal via the communication network, and comparing the access identifier signal with the authorized access identifier.

9. The method of claim 1, further comprising receiving a selection signal from the user indicative of a desired information, and transmitting the desired information to the user.

10. A method of providing access to educational data in a restricted-access educational information database, comprising:
    providing a computer system to a computer user, the computer system having an authorized access identifier, the authorized access identifier being a characteristic of the user's computer system and only allowing access to the restricted-access database from the computer system;
    providing rights to access a restricted-access database of educational information accessible via a communication network using the authorized access identifier;
    receiving an identifier input signal via the communication network;
    comparing the identifier input signal with the authorized access identifier;
    allowing access to the restricted-access educational information database when the identifier input signal matches the authorized access identifier without additional analysis of a type of desired data stored in the restricted-access educational information database and without analyzing a security characteristic of a communication path between the computer system and the restricted-access database;
    receiving a selection signal indicating a desired educational data; and
    transmitting the desired educational data via the communication network.

11. The method of claim 10, further comprising providing an access software program for accessing the restricted-access educational information database via the communication network.

12. The method of claim 10, further comprising obtaining the restricted-access educational information database from an educational information supplier.

13. The method of claim 10, further comprising generating the restricted-access educational information database.

14. The method of claim 10, further comprising updating the restricted-access educational information database.

15. The method of claim 10 wherein the educational information in the restricted-access database is limited to information about the computer system.

16. The method of claim 10 wherein the educational information in the restricted-access database is limited to information about a particular supplier's product.

17. A method of providing a computer user with access to a restricted-access database, comprising:
    obtaining access rights to the restricted-access database from an information supplier;
    providing a computer system to a computer user, the computer system having an access identifier that allows the user to access the restricted-access database via a communication network, the access identifier being a characteristic of the user's computer system and only allowing access to the restricted-access database from the computer system;
    receiving the access identifier via the communication network; and
    allowing access to the restricted-access database based on the access identifier regardless of a type of information stored in the restricted-access database and without analyzing a security characteristic of a communication path between the computer system and the restricted-access database.

18. The method of claim 17, further comprising informing the information supplier of the authorized access identifier.

19. The method of claim 17, further comprising providing a consideration to the information supplier for the access rights.

20. The method of claim 17, further comprising providing an access software program for accessing the restricted-access database.

21. The method of claim 17, further comprising supplementing the restricted-access database.

22. The method of claim 21 wherein supplementing the restricted-access database comprises transmitting an approximately real-time audio-visual signal.

* * * * *